United States Patent
Ono et al.

(10) Patent No.: US 10,233,873 B2
(45) Date of Patent: Mar. 19, 2019

(54) MOTORCYCLE

(71) Applicant: KAWASAKI JUKOGYO KABUSHIKI KAISHA, Kobe-shi, Hyogo (JP)

(72) Inventors: Masashi Ono, Kako-gun (JP); Ichiro Tanaka, Kakogawa (JP); Kotaro Hanabusa, Kobe (JP); Shinji Ikeda, Akashi (JP); Takashi Uchida, Kakogawa (JP); Tomo Yamamoto, Kobe (JP); Daisuke Saeki, Akashi (JP); Hiroshi Ishii, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 433 days.

(21) Appl. No.: 15/024,209

(22) PCT Filed: Jun. 13, 2014

(86) PCT No.: PCT/JP2014/003156
§ 371 (c)(1),
(2) Date: Mar. 23, 2016

(87) PCT Pub. No.: WO2015/049814
PCT Pub. Date: Apr. 9, 2015

(65) Prior Publication Data
US 2016/0245237 A1    Aug. 25, 2016

(30) Foreign Application Priority Data

Oct. 1, 2013    (JP) .................................. 2013-206504

(51) Int. Cl.
*F02M 25/08*    (2006.01)
*B62J 35/00*    (2006.01)
(Continued)

(52) U.S. Cl.
CPC ............ *F02M 25/089* (2013.01); *B62J 35/00* (2013.01); *B62J 37/00* (2013.01);
(Continued)

(58) Field of Classification Search
CPC ............................. B62J 37/00; F02M 25/0854
See application file for complete search history.

(56) References Cited

U.S. PATENT DOCUMENTS 8,215,677 B2 *   7/2012   Hosoya ..................... B62J 37/00
                                                   180/69.4
8,752,661 B2 *   6/2014   Nagura ..................... B62J 35/00
                                                   180/219
(Continued)

FOREIGN PATENT DOCUMENTS

JP      S53131119 U     10/1978
JP      S5573491 U       5/1980
(Continued)

OTHER PUBLICATIONS

Japanese Patent Office, Office Action Issued in Application No. 2013206504, dated Mar. 21, 2017, 11 pages.
(Continued)

*Primary Examiner* — Kevin Hurley
(74) *Attorney, Agent, or Firm* — Alleman Hall Creasman & Tuttle LLP

(57) ABSTRACT

A motorcycle includes a fuel tank, a vehicle body frame, a pair of front forks, and a canister. The fuel tank contains gasoline therein. The vehicle body frame supports the fuel tank. The pair of front forks are placed spaced apart from each other in a vehicle width direction to support a front wheel from both sides in the vehicle width direction such that the front wheel is rotatable, and mounted to the vehicle body frame such that the pair of front forks are rotatable around a head pipe. The canister adsorbs gasoline contained
(Continued)

in a gasoline vapor present inside the fuel tank and supplies the gasoline to an engine. The canister is placed inward in the vehicle width direction relative to the pair of front forks when viewed from a front, and in front of an engine when viewed from a side.

10 Claims, 8 Drawing Sheets

(51) Int. Cl.
  *B62J 37/00* (2006.01)
  *B62K 21/02* (2006.01)
  *B62M 7/02* (2006.01)
(52) U.S. Cl.
  CPC .... *F02M 25/0836* (2013.01); *F02M 25/0854* (2013.01); *F02M 25/0872* (2013.01); *B62K 21/02* (2013.01); *B62M 7/02* (2013.01)

(56) References Cited

U.S. PATENT DOCUMENTS

| | | | |
|---|---|---|---|
| 9,695,783 B2* | 7/2017 | Tsubone | F02M 25/0854 |
| 2018/0179992 A1* | 6/2018 | Morita | F02M 25/089 |

FOREIGN PATENT DOCUMENTS

| | | |
|---|---|---|
| JP | S5653973 A | 5/1981 |
| JP | S5846860 U | 3/1983 |
| JP | 2006123666 A | 5/2006 |
| JP | 2011031752 A | 2/2011 |
| JP | 2011117339 A | 6/2011 |
| JP | 201375587 A | 4/2013 |
| JP | 2013067271 A | 4/2013 |

OTHER PUBLICATIONS

European Patent Office, Extended European Search Report Issued in Application No. 14850435.0, dated Apr. 18, 2017, Germany, 8 pages.

ISA Japanese Patent Office, Written Opinion of the International Searching Authority Issued in Application No. PCT/JP2014/003156, dated Sep. 9, 2014, WIPO, 5 pages.

ISA Japanese Patent Office, International Search Report Issued in Application No. PCT/JP2014/003156, dated Sep. 9, 2014, WIPO, 3 pages.

* cited by examiner

MOTORCYCLE

TECHNICAL FIELD

The present invention relates to a motorcycle including a canister which adsorbs fuel contained in an evaporative emission present inside a fuel tank and supplies the fuel to an engine.

BACKGROUND ART

Gasoline stored in a fuel tank of a motorcycle is evaporated into a gasoline vapor. To reuse the gasoline vapor without releasing it to outside air, the motorcycle includes a canister placed below a seat. With an increase in functions incorporated into the motorcycle, the number of devices other than the canister, which are placed below the seat, tends to be increased, and a space below the seat in which the canister is placed tends to be reduced. Under these circumstances, the canister may be placed in a space other than the space below the seat. As an example of this, a fuel vapor treatment device disclosed in Patent Literature 1 is known. In the fuel vapor treatment device of Patent Literature 1, the canister is placed in a recess formed by a protruding portion, which is provided between a head light and a fuel tank and inward relative to an upper front side cowling.

CITATION LIST

Patent Literature

Patent Literature 1: Japanese Laid-Open Patent Application Publication No. 2011-31752

SUMMARY OF INVENTION

Technical Problem

With the advancement of technology, the number of functions with which a motorcycle is equipped tends to be increased, and correspondingly, the number of devices mounted in the motorcycle tends to be increased. In this situation, the locations at which the devices are placed in the motorcycle which does not incorporate many devices are switched to other locations in the motorcycle incorporating many devices, because of space limitations. In a layout in which the fuel vapor treatment device is placed in a wide space such as the recess formed by the protruding portion, as disclosed in Patent Literature 1, it is difficult to lay out other devices flexibly. The fuel vapor treatment device and other devices may be placed in the recess of Patent Literature 1 in such a way that the fuel vapor treatment device overlaps with other devices. However, in this layout, the upper front side cowling swells in a vehicle width direction, which increases the width of the motorcycle.

Accordingly, an object of the present invention is to provide a motorcycle which can include a canister without increasing the width of a vehicle body of the motorcycle and while laying out other devices more flexibly.

Solution to Problem

A motorcycle of the present invention comprises a fuel tank which stores fuel combusted in an engine; a vehicle body frame to which the fuel tank is mounted; a pair of front forks placed spaced apart from each other in a vehicle width direction to support a front wheel from both sides in the vehicle width direction such that the front wheel is rotatable, the pair of front forks being mounted to the vehicle body frame such that the pair of front forks are rotatable around center axes thereof extending vertically, respectively; and a canister which adsorbs the fuel contained in an evaporative emission present inside the fuel tank and supplies the fuel to the engine, wherein the canister is placed inward in the vehicle width direction relative to the pair of front forks when viewed from a front, and in front of the engine when viewed from a side.

In accordance with the present invention, the canister can be placed in an empty space formed in front of the engine. Therefore, the space can be efficiently utilized, and other components can be laid out more flexibly. Since the canister is placed inward in the vehicle width direction relative to the pair of front forks, the width of the vehicle body of the motorcycle is not increased.

In the above-described invention, the vehicle body frame may include a head pipe at a front end portion thereof, the pair of front forks may be mounted to the vehicle body frame such that the front forks are rotatable around the head pipe, and the canister may be placed in front of the head pipe.

In accordance with this configuration, the canister is placed in an empty space formed in front of the head pipe. In this layout, the canister can be easily accessed from the front of the head pipe, and can be easily mounted to the vehicle body.

In the above-described invention, the motorcycle may further comprise: a meter device which displays a vehicle speed, the meter device may be mounted to the vehicle body frame above the head pipe in such a manner that the meter device extends obliquely upward and forward, and the canister may be placed on a reverse side of an obverse surface of the meter device on which the vehicle speed is displayed.

In accordance with this configuration, since the canister is placed on the reverse side of the meter device extending obliquely upward and forward, the canister can be hidden from the rider. This makes it possible to eliminate a need for a cover member for covering the canister so that the canister is hidden. Therefore, the number of members is not increased.

In the above-described invention, the motorcycle may further comprise a cowling mounted to the vehicle body frame to cover the head pipe from the front, a front end portion of the cowling being provided with a head lamp unit, and the canister may be placed rearward relative to the head lamp unit and covered by the cowling.

In accordance to this configuration, an empty space located rearward relative to the head lamp unit can be efficiently utilized. The canister can be covered from the front to be hidden without using a cover member. Therefore, the number of members is not increased.

In the above-described invention, the vehicle body frame may include a head pipe at a front end portion thereof, and a pair of main frames extending obliquely rearward and outward in the vehicle width direction from the head pipe, the pair of front forks may be mounted to the vehicle body frame such that the front forks are rotatable around the head pipe, and the canister may be placed rearward relative to the front forks and the head pipe and between the pair of main frames.

In accordance with this configuration, the empty space located rearward relative to the head pipe can be efficiently utilized.

In the above-described invention, the fuel tank may be formed with an outlet on a side surface thereof, the evaporative emission being taken out through the outlet, the canister may include a suction port connected to the outlet via a pipe, the suction port may be placed higher than the outlet, and the pipe may extend to be inclined upward in a direction from the outlet toward the suction port.

In accordance with this configuration, even when the fuel contained in the evaporative emission is condensed inside the pipe, the flow of the condensed fuel toward the canister can be prevented. Since the pipe is inclined upward while preventing the pipe from having a U-shape, it becomes possible to prevent a situation in which the pipe is clogged with the condensed fuel accumulated inside the pipe.

In the above-described invention, the pipe may include an outlet section connected to the outlet, and a suction port section connected to the suction port, and the outlet of the fuel tank and the suction port of the canister may be connected to each other in a state in which the outlet section of the pipe and the suction port section of the pipe are joined to each other.

In accordance with this configuration, the fuel tank and the canister are independently mounted to the vehicle body frame, and then the outlet section of the pipe and the suction port section of the pipe are joined to each other. In this way, the outlet of the fuel tank and the suction port of the canister can be connected to each other. Therefore, mounting of the pipe can be performed easily.

In the above-described invention, the outlet of the fuel tank may be located on a front side of the fuel tank (located close to the front end of the fuel tank).

A pipe which is very low in permeability with respect to the evaporative emission is used as the above-described pipe. For this reason, the pipe is expensive. However, in accordance with the above configuration, the outlet of the fuel tank is placed on the front side of the fuel tank. Therefore, the pipe can be shortened compared to, for example, a layout in which the canister is placed below a seat. As a result, the manufacturing cost can be reduced.

In the above-described invention, the canister may be mounted to the vehicle body frame via a canister bracket.

In accordance with this configuration, the canister is not displaced when the pair of front forks are rotated. Therefore, it becomes possible to prevent a situation in which the pipe is sandwiched between the canister and the vehicle body frame.

In the above-described invention, the canister bracket may be configured to retain the pipe.

In accordance with this configuration, it becomes possible to prevent a situation in which the pipe is sandwiched between the front forks and the vehicle body frame, when the pair of front forks are rotated. Therefore, it is not necessary to provide a bracket exclusively used for the pipe. As a result, the number of components is not increased.

In the above-described invention, the motorcycle may further comprise a valve which adjusts an amount of the fuel supplied from the canister to the engine, and the canister bracket may be configured to retain the valve.

In accordance with this configuration, the valve can be sub-assembled to the canister bracket in advance. Thus, mounting of the valve becomes easier. Since it is not necessary to provide a bracket exclusively used for the valve, the number of the members is not increased.

Advantageous Effects of Invention

In accordance with the present invention, the canister can be placed without increasing the width of the vehicle body of the motorcycle while laying out other components more flexibly.

The above and further objects, features, and advantages of the present invention will more fully be apparent from the following detailed description of preferred embodiments with reference to the accompanying drawings.

DESCRIPTION OF EMBODIMENTS

Hereinafter, a motorcycle 1 of Embodiment 1 and a motorcycle 1A of Embodiment 2 of the present invention will be described with reference to the drawings. The directions stated below are from the perspective of a rider straddling the motorcycle 1, 1A. However, the directions are defined for easier description, and the directions or the like of the components of the invention are not limited to the stated directions or the like. Further, the motorcycle 1, 1A described below is merely one embodiment of the present invention. Therefore, the present invention is not limited to the embodiments described below, and the configuration of the present invention can be changed, added to, or deleted from, within a scope of the spirit of the present invention.

[Embodiment 1]

Figure 1:
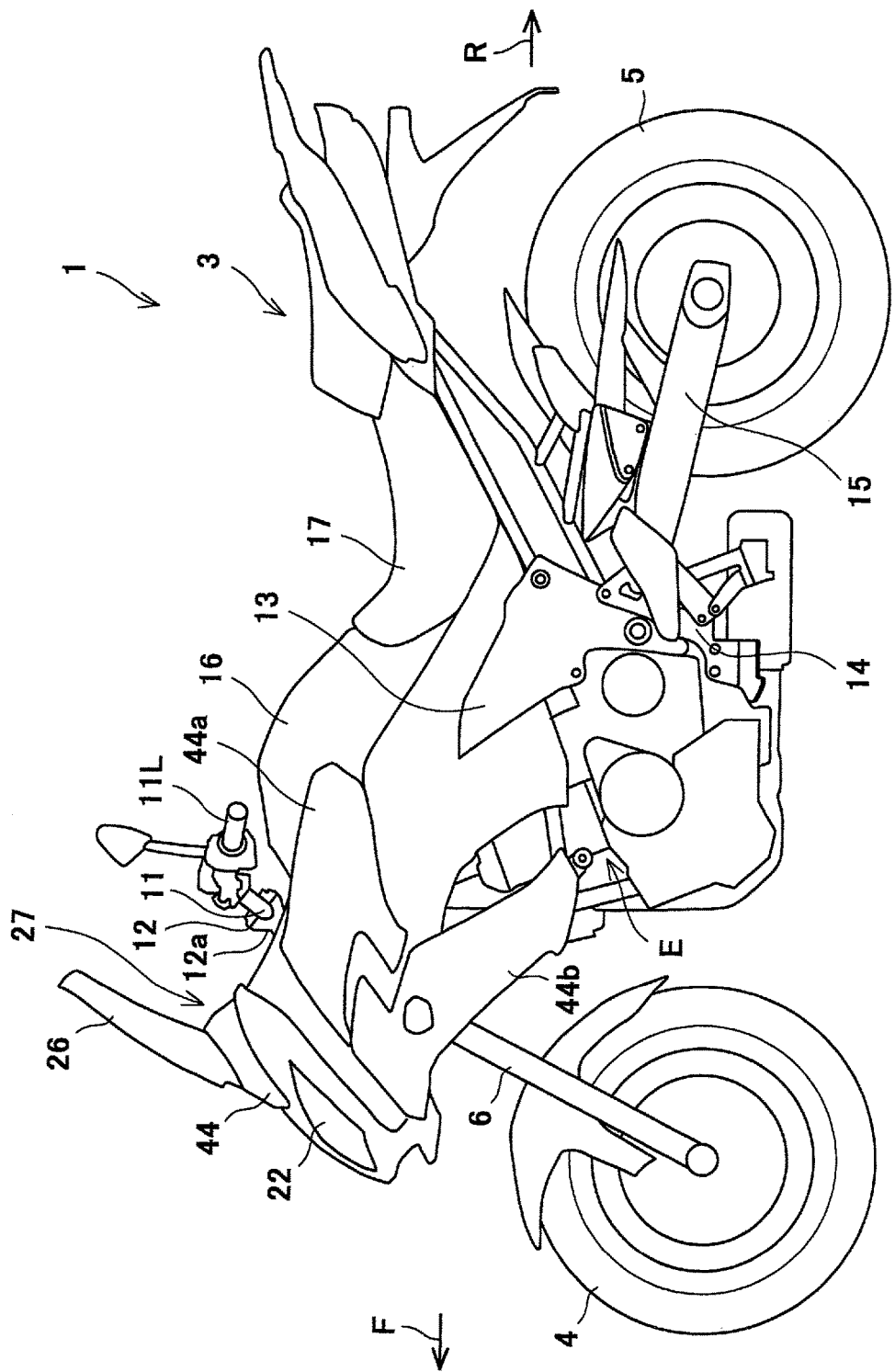
FIG. 1 is a side view showing a motorcycle according to Embodiment 1.

As shown in FIG. 1, a motorcycle 1 is a motorcycle of a multi-purpose type (or a dual purpose type). The motorcycle 1 includes a vehicle body 3, a front wheel 4, and a rear wheel 5. The front wheel 4 and the rear wheel 5 are rotatably mounted to the vehicle body 3. More specifically, with reference to FIG. 2, the front wheel 4 is provided with a pair of front forks 6. The pair of front forks 6 are placed spaced apart from each other in a vehicle width direction (rightward and leftward direction). The lower end portions of the pair of front forks 6 support the front wheel 4 from both sides in the vehicle width direction such that the front wheel 4 is rotatable. The pair of front forks 6 extend obliquely upward from the front wheel 4. As shown in FIGS. 2 to 5, an upper bracket 7 is provided on the pair of front forks 6 in such a way that the upper bracket 7 is placed between the upper end portions of the pair of front forks 6 and connects them to each other. In addition, an under bracket 8 is provided on the pair of front forks 6 in such a way that the under bracket 8 is placed below the upper bracket 7 and between the pair of front forks 6 and connects the front forks 6 to each other. A steering shaft (not shown) is provided on the upper bracket 7 and the under bracket 8 in such a way that the steering shaft is placed between the upper bracket 7 and the under bracket 8 and connects the upper bracket 7 and the under bracket 8 to each other. The steering shaft extends substantially in parallel with the front forks 6, and is attached to a vehicle body frame 9. The vehicle body frame 9 includes a head pipe 10 at a front end portion thereof. The steering shaft is rotatably inserted into the head pipe 10.

A handle stem 12 is provided on the upper surface of the upper bracket 7. The handle stem 12 includes a pair of handle retaining sections 12a, 12b. The pair of handle retaining sections 12a, 12b protrude upward toward the rider. The pair of handle retaining sections 12a, 12b are placed spaced apart from each other in the vehicle width direction. A single handle bar 11 is attached to the pair of handle retaining sections 12a, 12b. The handle bar 11 is placed in a high position which is close to the rider straddling the vehicle body. The right and left end portions of the handle bar 11 protrude outward in the vehicle width direction from the handle stem 12. Handle grips 11L, 11R are attached to the left and right end portions of the handle bar 11, respectively. The handle grips 11L, 11R can be gripped with the rider's hands, respectively. The rider grips the handle grips 11L, 11R and rotates the handle bar 11. According to the rotation of the handle bar 11, the pair of front forks 6 rotate around the head pipe 10 (namely, around the center axis of the head pipe 10 extending vertically), and thereby, the front wheel 4 can be turned in a desired direction. In this way, the pair of front forks 6 are mounted to the vehicle body frame 9 such that the front forks 6 are rotatable around the head pipe 10.

A pair of right and left main frames 13 are integrally provided on the head pipe 10. The pair of right and left main frames 13 extend rearward and outward in the vehicle width direction from the head pipe 10 in such a manner that the main frames 13 are inclined slightly downward. As shown in FIG. 1, a pair of right and left pivot frames 14 are connected to the rear end portions of the main frame 13, respectively. The front end portion of a swing arm 15 extending substantially in the forward and rearward direction is mounted to the pivot frames 14 such that the swing arm 15 is rotatable. The rear wheel 5 is rotatably mounted to the rear end portion of the swing arm 15. A fuel tank 16 which stores gasoline combusted in an engine E which will be described later is placed rearward relative to the head pipe 10. The fuel tank 16 is placed over the pair of main frames 13. A straddle seat 17 straddled by the rider is placed rearward relative to the fuel tank 16.

Figure 2:
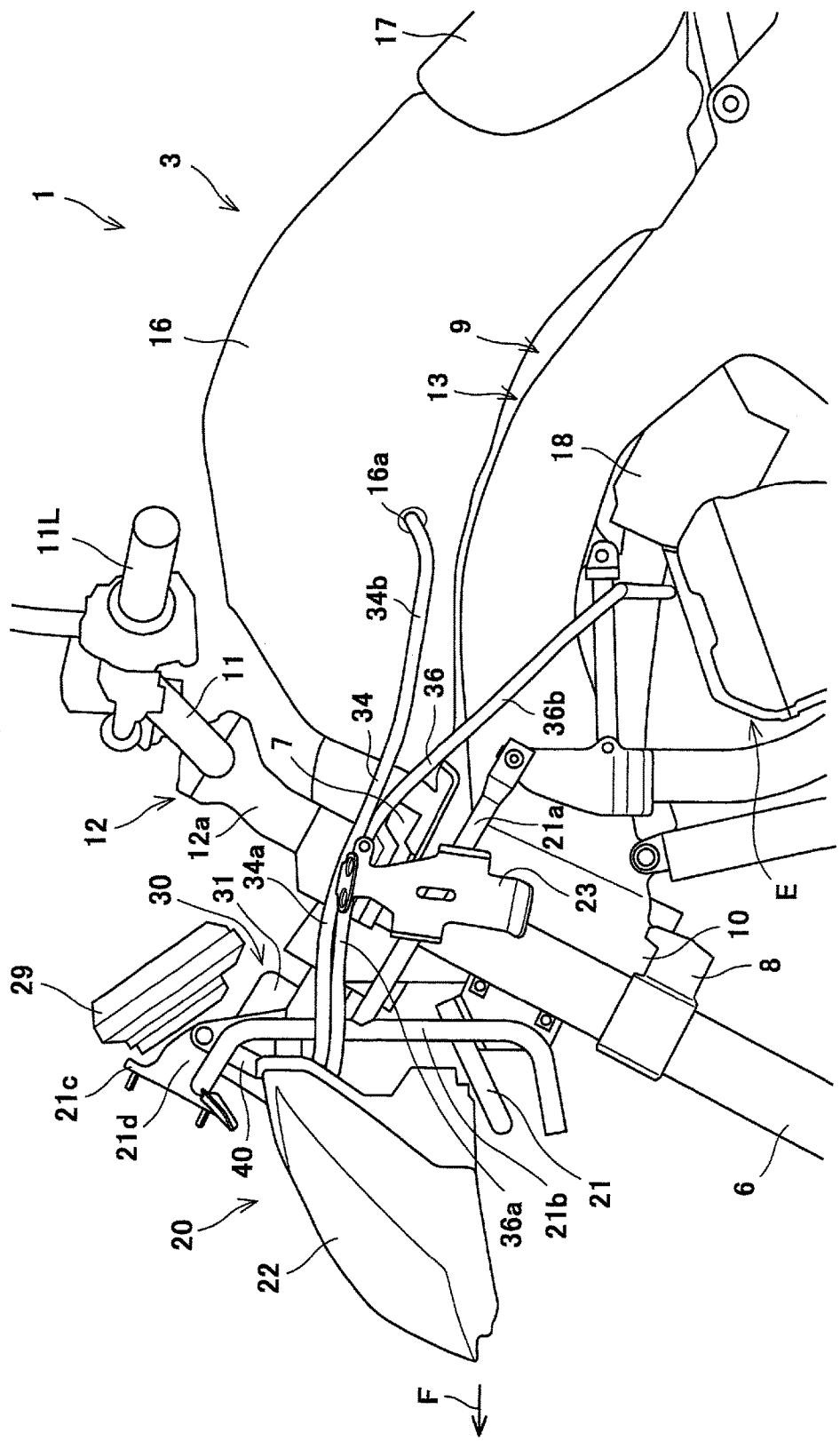
FIG. 2 is an enlarged side view showing the front portion of the motorcycle of FIG. 1, in a state in which a front cowling is detached from a vehicle body.

As shown in FIG. 1, the engine E is placed below the fuel tank 16 and between the front wheel 4 and the rear wheel 5, and mounted to the main frames 13 and the pivot frames 14. A transmission (not shown) is connected to the engine E. Driving power output from the transmission is transmitted to the rear wheel 5 via a chain (not shown). As shown in FIG. 2, a throttle device 18 is placed inward relative to the main frames 13 and connected to the intake ports of the engine E. An air cleaner (not shown) is placed below the fuel tank 16 and connected to the upstream portion of the throttle device 18. The air cleaner takes in outside air.

Figure 3:
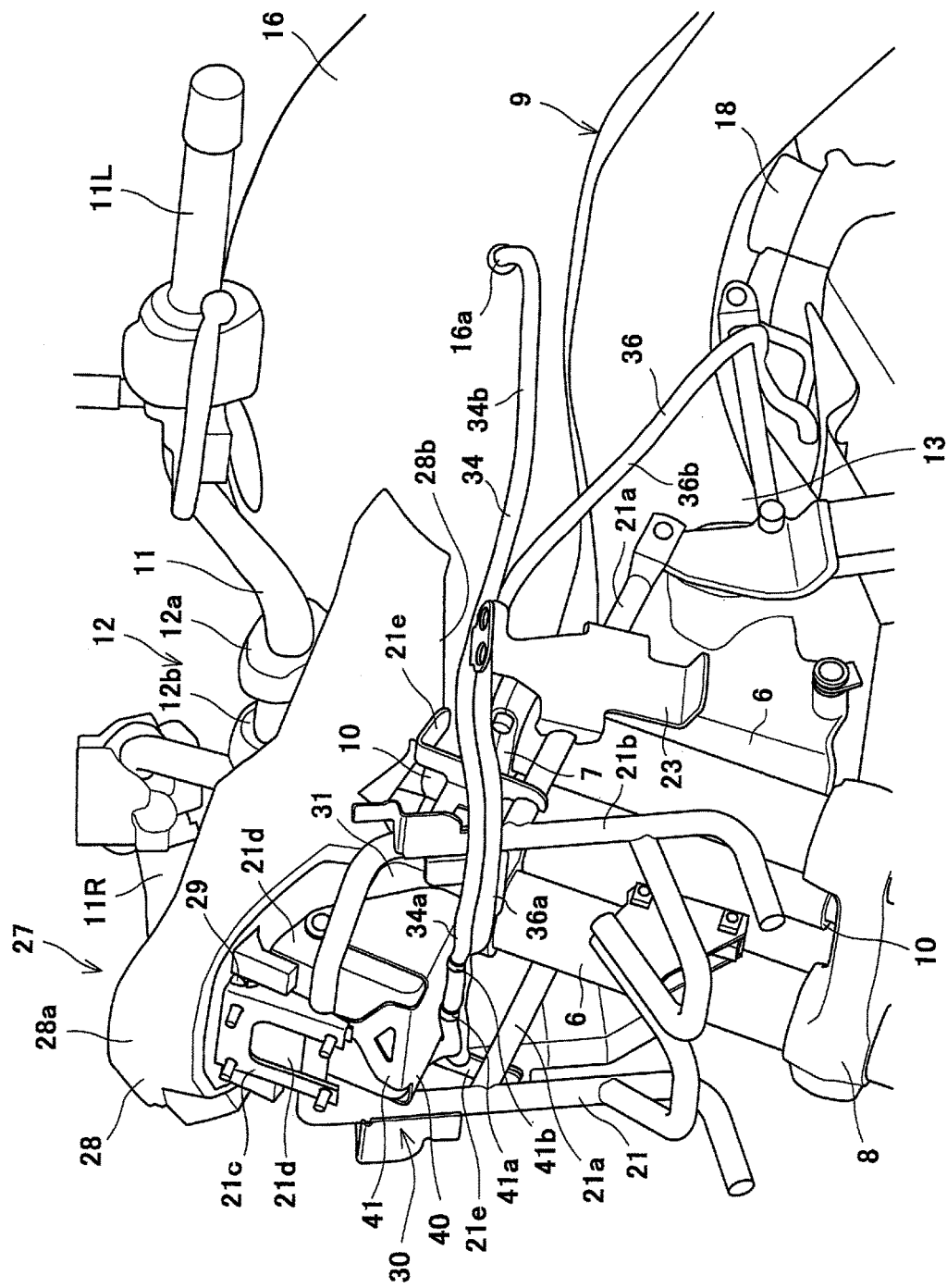
FIG. 3 is an enlarged perspective view showing the motorcycle of FIG. 2 in a state in which a head lamp is detached from the vehicle body.
Figure 4:
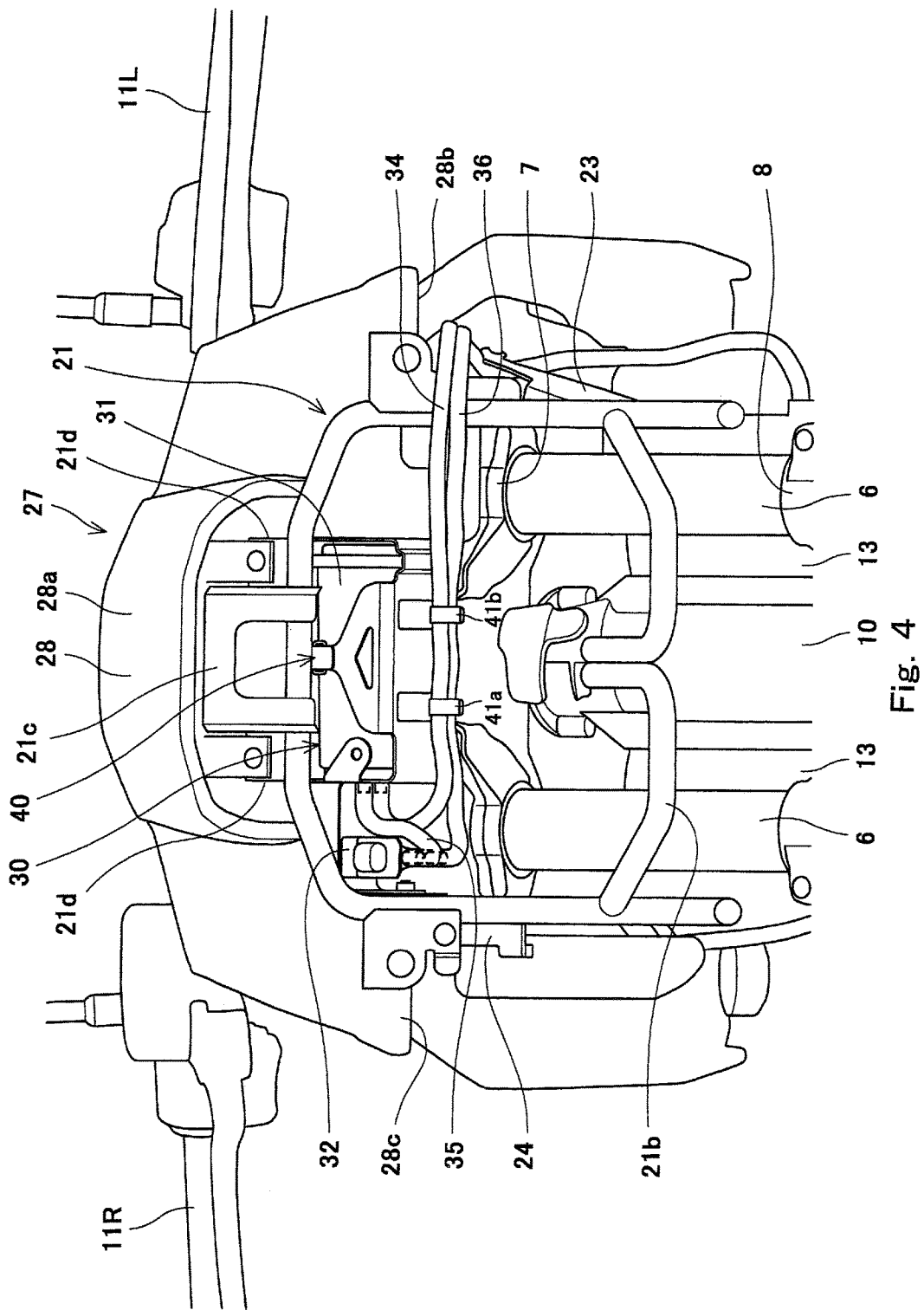
FIG. 4 is an enlarged front view of the motorcycle of FIG. 3.

As shown in FIG. 2, a head lamp unit 20 is placed in front of the handle bar 11 (F indicates forward), and mounted to the main frame 13 via a mounting unit 21. As shown in FIGS. 2 to 4, the mounting unit 21 includes a pair of coupling pipes 21a, which are fastened to the right and left main frames 13, respectively. The coupling pipes 21a extend obliquely upward and forward from the main frames 13, respectively. The coupling pipes 21a extend outward in the vehicle width direction relative to the pair of front forks 6, respectively, and protrude farther forward than the pair of front forks 6 do, respectively. A regulator bracket 23 is integrally provided on the left coupling pipe 21a, while a radiator bracket 24 is integrally provided on the right coupling pipe 21a. The two brackets 23, 24 are placed in the vicinity of the pair of front forks 6, respectively. A regulator and a radiator tank are mounted to the coupling pipes 21a, via the brackets 23, 24, respectively. The regulator and the radiator tank mounted in this way are located inward relative to a portion of a front cowling 44 (described later) which protrudes radially outward. Frame bodies 21b are integrally provided on the front ends of the pair of coupling pipes 21a, respectively.

The frame bodies 21b have a substantially rectangular frame shape when viewed from the front. The head lamp unit 20 is mounted to the frame bodies 21b. The head lamp unit 20 has a substantially-U shape which is symmetric in the rightward and leftward direction, and includes two head lamps 22. The two head lamps 22 are placed spaced apart from each other in the rightward and leftward direction. The two head lamps 22 are placed inclined upward as they extend outward from a center in the vehicle width direction. In this layout, between the two head lamps 22, a space is formed. The head lamp unit 20 configured in the above-described manner is mounted to the front surfaces of the frame bodies 21b and located at the head of the vehicle body 3 of the motorcycle. The head lamp unit 20 is located below the upper frame portions of the frame bodies 21b. The upper frame portions protrude farther forward than the remaining portions of the frame bodies 21b do. A shield mounting section 21c and a pair of meter mounting sections 21d are integrally provided on the upper frame portions of the frame bodies 21b, respectively.

The shield mounting section 21c is located in the center portion of the vehicle body in the vehicle width direction. A wind shield 26 is mounted to the shield mounting section 21c (see FIGS. 1 and 5). The wind shield 26 is a plate member made of a material having translucency. The wind shield 26 extends substantially upward and obliquely rearward from the shield mounting section 21c. The wind shield 26 can shield the rider from ram air blowing from the front toward the rider without degrading the rider's visibility. The meter mounting sections 21d are placed on the right and left sides of the shield mounting section 21c to which the wind shield 26 is mounted. A meter device 27 is mounted to the meter mounting sections 21d.

The meter device 27 includes a meter cover 28 and a gauge 29. The meter cover 28 has a substantially-U shape when viewed from above. The meter cover 28 is placed above the upper bracket 7 so that the handle stem 12 is fitted into a groove formed in the center of the meter cover 28 in the vehicle width direction and a curved portion 28a is located on a front side thereof. The meter cover 28 placed in this way covers the mounting unit 21, the head lamp unit 20, a fuel vapor supply device 30 which will be described later, etc., from above to make these devices hidden from the rider straddling the vehicle body. The meter cover 28 is inclined upward as it extends forward. The curved portion 28a of the meter cover 28 extends farther upward than the remaining portion of the meter cover 28 does. The gauge 29 is attached to the curved portion 28a. The gauge 29 is configured to display a vehicle speed, the engine speed of the engine E, an oil temperature, etc. The gauge 29 is attached to the obverse surface of the meter cover 28 so that the rider can see display sections which display the vehicle speed, the engine speed, the oil temperature, etc. In the present embodiment, the gauge 29 is placed at substantially the center of the meter cover 28 in the vehicle width direction.

In the meter device 27 configured as described above, the reverse side (i.e., front surface) of the curved portion 28a of the meter cover 28 is coupled to the meter mounting sections 21d, and the reverse surfaces of the end portions 28b, 28c of the meter cover 28 are coupled to the meter mounting sections 21e integrally provided on the coupling pipes 21a, respectively. Between the meter device 27 supported at four points as described above, and the head lamp unit 20, the fuel vapor supply device 30 is placed in front of the head pipe 10 and below the wind shield 26.

Figure 6:
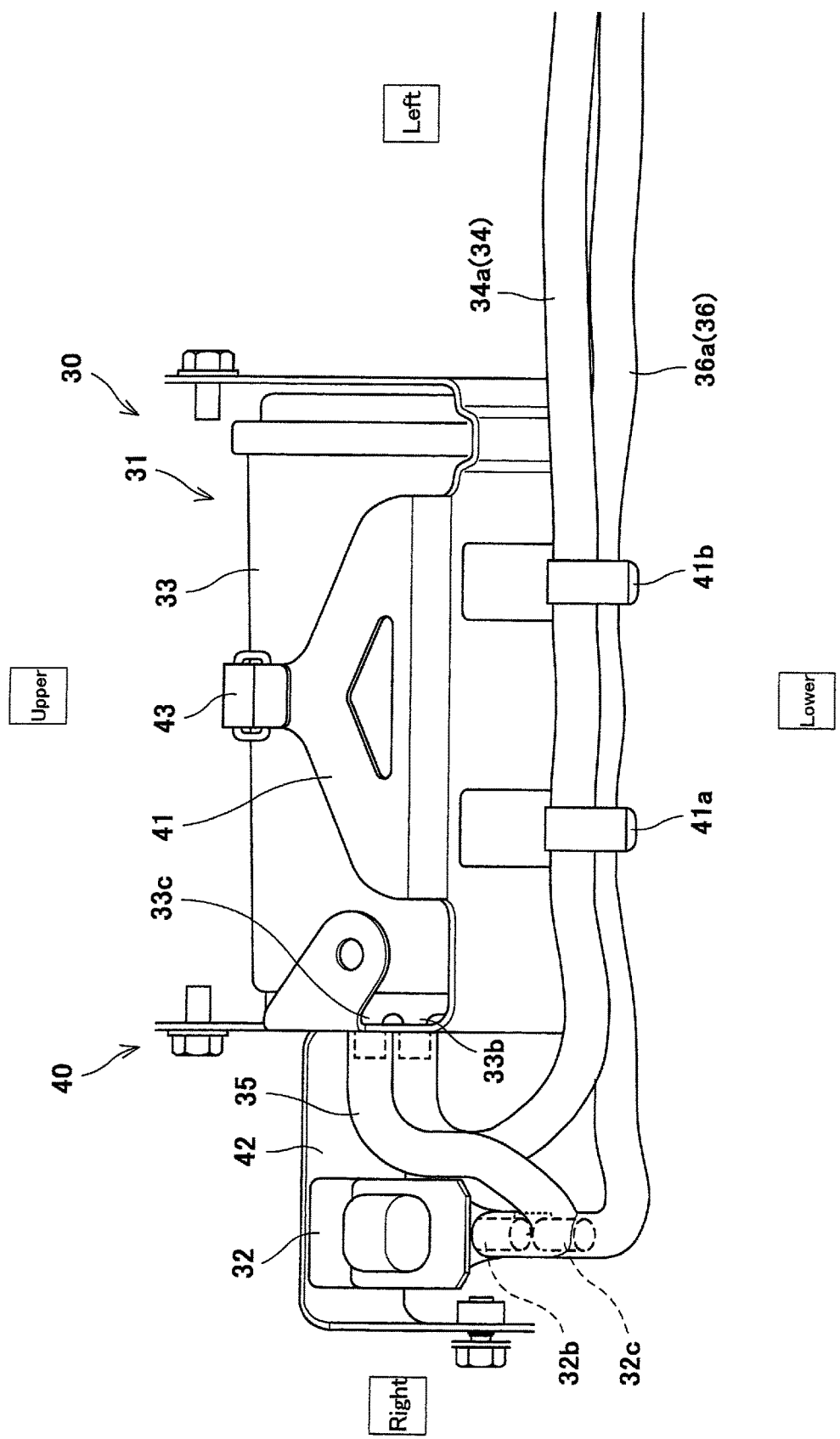
FIG. 6 is an enlarged front view showing the motorcycle of FIG. 1, in a state in which a fuel vapor supply device is detached from the vehicle body.

The fuel vapor supply device 30 is configured to supply to the throttle device 18, fuel evaporated in the fuel tank 16, i.e., a gasoline vapor (evaporative emission). As shown in FIG. 6, the fuel vapor supply device 30 includes a canister 31 and an opening/closing valve 32. The canister 31 includes a box 33 of an elongated rectangular parallelepiped shape. In the box 33, an adsorbing material (adsorbent) which adsorbs the gasoline vapor, specifically, active carbon, is stored. The left end portion of the box 33 is formed with an inlet (not shown), and outside air is taken into the box 33 through this inlet. The right end portion of the box 33 is formed with an intake port 33b and a discharge port 33c.

The intake port 33b which is a suction port is connected to the interior of the fuel tank 16 via a tank tube 34. As shown in FIG. 2, the fuel tank 16 is placed to extend rearward such that the fuel tank 16 is inclined slightly downward along the main frames 13. The left side surface of a portion of the fuel tank 16, which is close its front end, is formed with an outlet 16a. The outlet 16a is connected to the internal region of the fuel tank 16 which is near its top portion, via an internal pipe which is not shown. The gasoline vapor generated inside the fuel tank 16 is guided to the outlet 16a via the internal pipe. The tank tube 34 is connected to the outlet 16a. The gasoline vapor is guided to the interior of the box 33 via the tank tube 34 and the intake port 33b of the canister 31. In the interior of the box 33, the gasoline vapor is adsorbed onto the active carbon provided inside the box 33. The box 33 is able to discharge the adsorbed gasoline vapor through the discharge port 33c, together with the outside air taken into the box 33 through the inlet.

The discharge port 33c is connected to the opening/closing valve 32 via an intermediate tube 35. The opening/closing valve 32 is an opening/closing valve of a solenoid type, and includes a valve inlet 32b and a valve outlet 32c. The interior of the opening/closing valve 32 is formed with a passage connecting the valve inlet 32b to the valve outlet 32c. The opening/closing valve 32 is configured to open and close this passage, in response to a command output from an ECU (not shown) based on the running state of the engine E. The valve inlet 32b of the opening/closing valve 32 is connected to the discharge port 33c of the canister 31 via the intermediate tube 35. The valve outlet 32c of the opening/closing valve 32 is connected to an air-intake pipe of the throttle device 18 via a supply tube 36. The air-intake pipe has a negative pressure, compared to outside air, during the running of the engine E. For this reason, when the opening/closing valve 32 opens the above-described passage, the gasoline vapor adsorbed onto the active carbon provided inside the box 33 flows into the air-intake pipe together with the outside air, while when the opening/closing valve 32 closes the above-described passage, the flow of the gasoline vapor and the outside air can be stopped. In this configuration, by controlling a time for which the opening/closing valve 32 is opened or closed, and the number of times the opening/closing valve 32 is opened or closed, the amount of gasoline supplied from the canister 31 to the throttle device 18 can be adjusted. The fuel vapor supply device 30 configured in the above-described manner is mounted to a bracket 40 (e.g., a canister bracket), and to the mounting unit 21 via the bracket 40.

As shown in FIG. 6, the bracket 40 includes a bracket body 41 and a valve mounting plate 42. The bracket body 41 is plastically deformed to have a substantially-U shape, by bending portions near the right and left portions of a plate member. The canister 31 is placed between the right and left walls of the bracket body 41. The bracket body 41 also has walls extending upward, at front and rear end portions thereof. A band 43 is engaged with the front and rear walls, and thus the canister 31 is secured to the bracket body 41 and is not disengaged from the bracket body 41. The left wall of the bracket body 41 is formed with a through-hole (not shown). Through this through-hole, the intake port 33b and the discharge port 33c of the canister 31 protrude to outside of the bracket body 41. The right wall of the bracket body 41 is integrally formed with the valve mounting plate 42. The valve mounting plate 42 is a plate member having a substantially-L shape. The valve mounting plate 42 extends to the right, from the upper end of the right wall of the bracket body 41, and then extends forward and obliquely downward and in parallel with the right wall. The opening/closing valve 32 is mounted to the valve mounting plate 42.

The lower portion of the bracket body 41 is formed with a pair of clamps 41a, 41b. The tank tube 34 extending from the canister 31 and the supply tube 36 extending from the opening/closing valve 32, are clamped by the pair of clamps 41a, 41b. The tank tube 34 is dividable into a canister section 34a connected to the canister 31 and a tank section 34b connected to the fuel tank 16. The supply tube 36 is dividable into a valve section 36a connected to the opening/closing valve 32 and a tank section 36b connected to the throttle device 18. These sections 34a, 34b, 36a, 36b are mounted to the corresponding components 31, 16, 32, 18, respectively. After that, the sections 34a, 34b are coupled to each other to form the tank tube 34, and the sections 36a, 36b are coupled to each other to form the supply tube 36. In the present embodiment, the pair of clamps 41a, 41b for retaining the tank tube 34 and the supply tube 36 are configured to clamp the canister section 34a and the valve section 36a together. Alternatively, the pair of clamps 41a, 41b may be provided separately to correspond to the tubes 34, 36, respectively.

The canister 31 and the opening/closing valve 32 are mounted to the bracket 40 configured as described above. The tank tube 34 and the supply tube 36 are clamped to the bracket 40. In this way, the fuel vapor supply device 30 including a plurality of constituents is sub-assembled in advance to the bracket 40 as a unit. The fuel vapor supply device 30 configured as the unit is mounted to the mounting unit 21 via the bracket 40 and further to the main frames 13 via the mounting unit 21. More specifically, the upper end portions of the right and left walls of the bracket body 41 are fastened to the pair of meter mounting sections 21d, respectively, and the bracket 40 is located below the shield mounting section 21c. Also, the valve mounting plate 42 is fastened to the radiator bracket 24 by the bracket 40, and the bracket 40 is located inward relative to the mounting unit 21, when viewed from the front.

In the above-described manner, the bracket 40 is mounted to the main frames 13 via the mounting unit 21, and the canister 31 mounted to the bracket 40 is placed in front of the head pipe 10 and on the reverse side of the meter device 27. On the rear side of the meter device 27, there is formed a space in which relatively few components are placed. Since the canister 31 is placed in the space formed on the reverse side of the meter device 27, an empty space can be efficiently utilized. In this layout, a space in which the canister 31 is placed in the conventional example can be made empty, and other components can be laid out more flexibly in this empty space. The canister 31 is placed between the right and left frame members of the mounting unit 21 when viewed from the front in such a manner that the longitudinal center of the canister 31 substantially conforms to the center of the vehicle body in the vehicle width direction. More specifically, the canister 31 is placed inward in the vehicle width direction relative to the pair of front forks 6 located rearward relative to the canister 31. The canister 31 is located in front of the front forks 6 at a distance from the front forks 6. In this layout, when the handle 11 is rotated, the pair of front forks 6 and the upper bracket 7 do not contact the canister 31. The phrase "the canister 31 is placed inward in the vehicle width direction relative to the pair of front forks 6" means that the right and left end portions of the canister 31 do not protrude farther outward in the vehicle width direction than the pair of front forks 6 do, respectively, when viewed from the front.

The bracket 40 is placed in a position which is rearward relative to the head lamp unit 20 and higher than the head lamp unit 20 to prevent the canister 31 from contacting the head lamp unit 20. Further, the bracket 40 is placed inclined upward and obliquely forward in such a manner that the front side of the canister 31 is raised. The intake port 33b of the canister 31 is placed in this way, and the pair of clamps 41a, 41b of the bracket 40 are placed higher than the outlet 16a of the fuel tank 16. The tank tube 34 is placed to extend rearward and obliquely below the canister 31 when viewed from the side (extends to be inclined upward from the outlet 16a toward the intake port 33b), while preventing the tank tube 34 from being deflected vertically, or in other words, preventing the tank tube 34 from having a U-shape. In this layout, even when the gasoline vapor is condensed into gasoline inside the tank tube 34, it becomes possible to prevent the gasoline from being guided to the canister 31. Further, the tank tube 34 is made inclined while preventing the tank tube 34 from having a U-shape. Therefore, even when the condensed gasoline is accumulated inside a pipe, the increase rate of a gasoline level within the tank tube 34 can be suppressed. This makes it possible to prevent a situation in which the passage of the tank tube 34 is clogged with the gasoline, and thus prevent the degradation of the function of the fuel vapor supply device 30, which would be caused by the clogging of the passage.

As described above, the fuel vapor supply device 30, the head lamp unit 20, or the like are mounted to the front end portion of the vehicle body 3 via the bracket 40. As shown in FIG. 1, the front cowling 44 is placed to cover the front end portion of the vehicle body 3 from the front, to cover the fuel vapor supply device 30, the head lamp unit 20, or the like, and the head pipe 10. The front cowling 44 has a substantially-U shape when viewed from above. The front cowling 44 is placed to cover the front end portion of the vehicle body 3 from the front and mounted to the right and left frames of the mounting unit 21. The front cowling 44 is formed with holes in locations corresponding to outer lenses of the pair of head lamps 22, respectively. The outer lenses of the pair of head lamps 22 are fitted into these holes, respectively.

Figure 5:
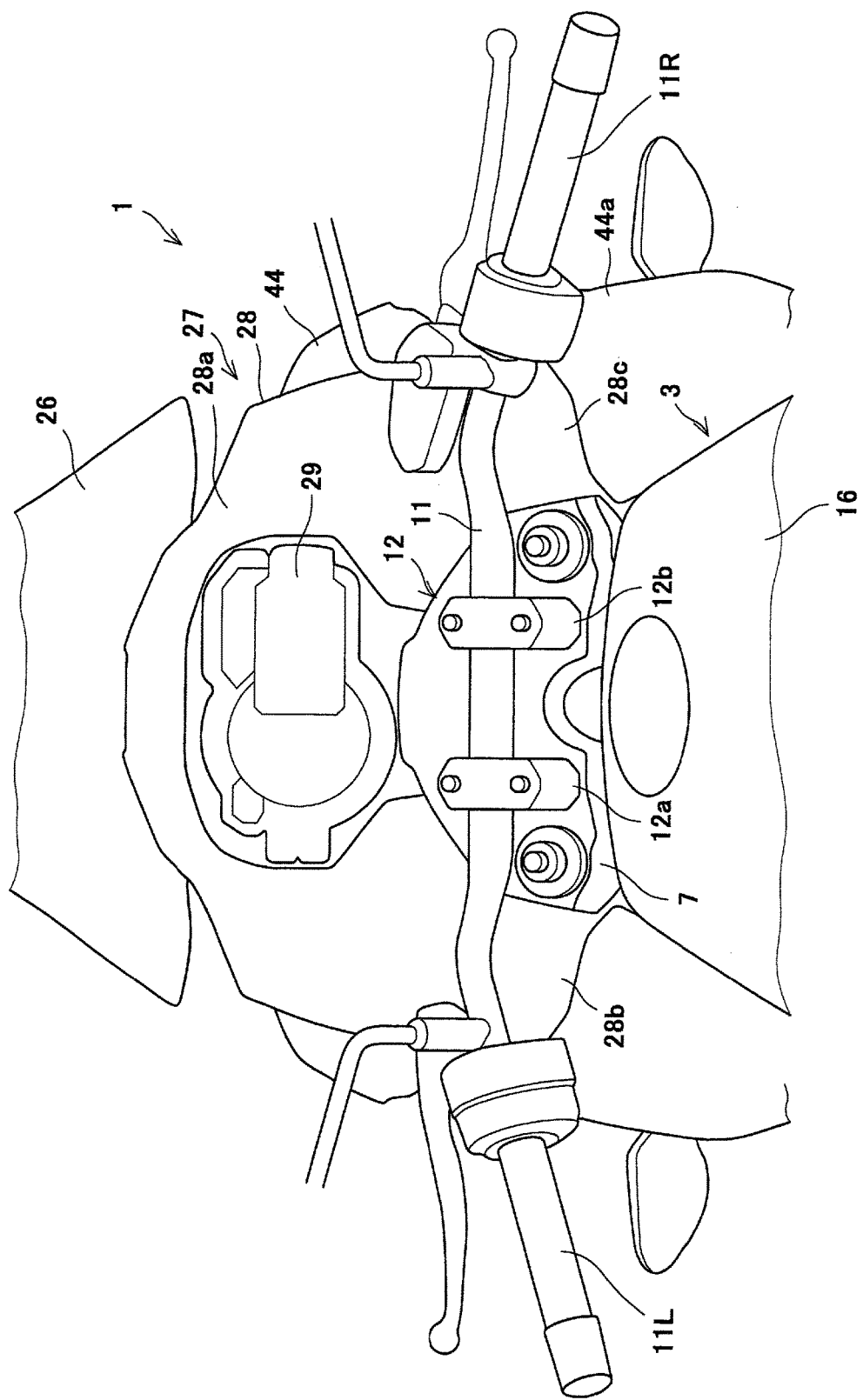
FIG. 5 is an enlarged view showing a region of the motorcycle of FIG. 1, the region being in the vicinity of a meter device, when viewed from the perspective of a rider straddling the vehicle body.

The front cowling 44 also covers the upper portion of the head pipe 10 and the upper portions of the front forks 6, from the right and the left. Another portion of the front cowling 44, which is located rearward relative to the portion of the front cowling 44 which covers the upper portion of the head pipe 10 and the upper portions of the front forks 6, is divided into upper and lower parts. An upper cowling 44a which is the upper part extends to the outlet 16a of the fuel tank 16 and covers the whole of the tank tube 34. A lower cowling 44b which is the lower part extends to a region which is in the vicinity of the engine E. As shown in FIG. 5, the front cowling 44 having such a configuration has a substantially-U shape when viewed from above, as described above. A substantially-U shaped space is formed between the pair of front forks 6 and the upper bracket 7, when viewed from above. The meter cover 28 of the meter device 27 covers this space to hide the components (the fuel vapor supply device 30, the head lamp unit 20, and the like) placed at the front end portion of the vehicle body 3 from the rider. This can eliminate a need for a cover member for covering, for example, the canister 31, which can prevent an increase in the number of components. Since the canister 31 is covered by the front cowling 44, the canister 31 can be hidden from the front, without a need for the cover member. Therefore, the number of components is not increased.

In the motorcycle 1 configured as described above, the canister 31 is placed in the space formed on the reverse side of the meter device 27. In this layout, the canister 31 is easily accessible in a state in which the front cowling 44 is detached as shown in FIG. 2. This makes it possible to easily detach the canister 31. Further, since the canister 31 is placed inward in the vehicle width direction relative to the pair of front forks 6, other components (in particular, components having outer shape dimensions larger than that of the canister 31) can be placed in a large space formed between the front cowling 44 and the vehicle body 3, in the motorcycle 1. Thus, other components can be laid out more flexibly. Moreover, for example, if the canister 31 is placed between the front cowling 44 and the vehicle body 3, the width of the vehicle body of the motorcycle 1 is not increased.

The tubes 34 to 36 used as pipes for guiding the gasoline vapor are very low in permeability with respect to the gasoline vapor to prevent gas leakage therefrom. For this reason, these tubes are expensive. However, in the motorcycle 1, the outlet 16a is provided on the front side of the fuel tank 16, which is close to the canister 31. Therefore, the tank tube 34 can be shortened compared to, for example, a layout in which the canister 31 is placed below the seat 17. As a result, manufacturing cost can be reduced.

In the motorcycle 1, the canister 31 is mounted to the main frames 13 via the bracket 40 and the mounting unit 21. This makes it possible to prevent a situation in which the canister 31 is displaced along with the pair of front forks 6. Therefore, it becomes possible to prevent a situation in which the tank tube 34 and the supply tube 36 are sandwiched between the displaced canister 31 and the main frame 13. Further, since the tank tube 34 and the supply tube 36 are clamped by the pair of clamps 41a, 41b, it becomes possible to prevent the tank tube 34 and the supply tube 36 from being displaced. Therefore, it becomes possible to prevent a situation in which the tank tube 34 and the supply tube 36 are sandwiched between members, for example, the rotated pair of front forks 6 and the canister 31.

Moreover, in the motorcycle 1, the canister 31 and the opening/closing valve 32 can be sub-assembled to the bracket 40 in advance, and thus mounting is easy. Also, since it is not necessary to provide a bracket used exclusively for the valve, the number of members is not increased.

[Embodiment 2]

The configuration of a motorcycle 1A of Embodiment 2 is similar to that of the motorcycle 1 of Embodiment 1. Therefore, regarding the configuration of the motorcycle 1A of Embodiment 2, only differences from the configuration of the motorcycle 1 of Embodiment 1 will be described, and the same configuration as that of the motorcycle 1 of Embodiment 1 will not be described repeatedly.

Figure 7:
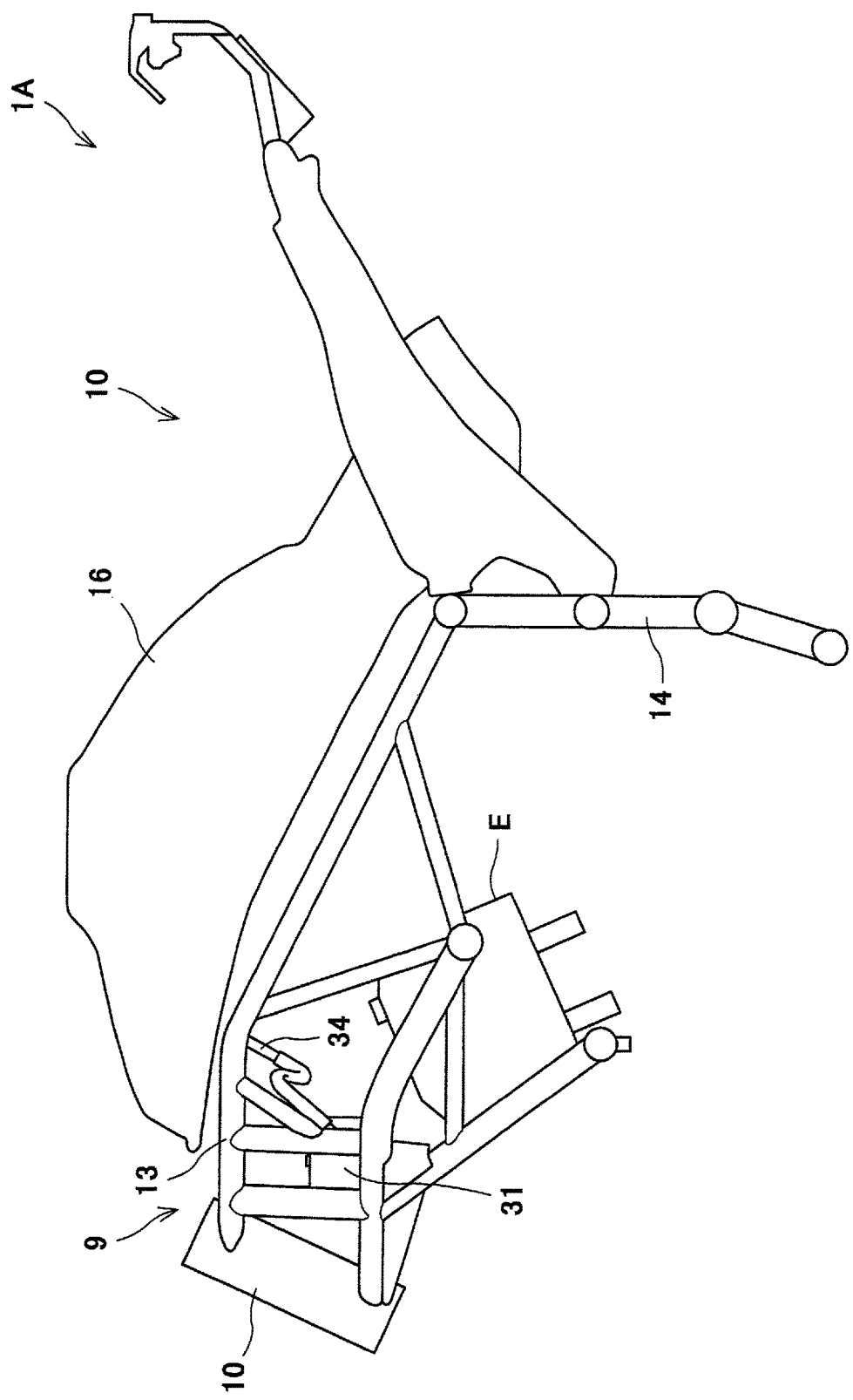
FIG. 7 is a side view showing a motorcycle according to Embodiment 2, in a state in which components other than major components are detached from the vehicle body.
Figure 8:
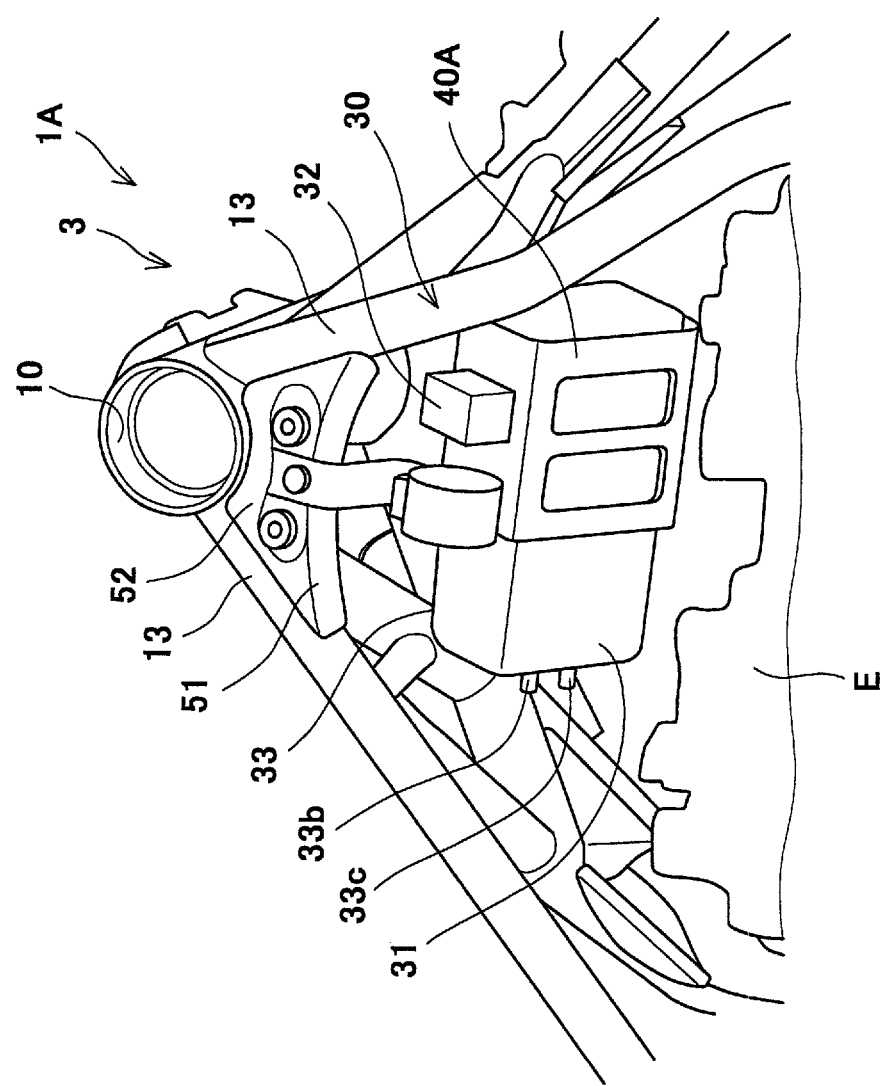
FIG. 8 is a partial perspective view showing the motorcycle of FIG. 6, in a state in which a fuel tank, among the major components, is detached from the vehicle body, when viewed from above and obliquely from the rear.

As shown in FIGS. 7 and 8, in the motorcycle 1A of Embodiment 2, the fuel vapor supply device 30 is placed rearward relative to the head pipe 10 and in front of the engine E. More specifically, the pair of right and left main frames 13 are integrally provided on the head pipe 10 such that the main frames 13 extend rearward and outward in the vehicle width direction from the head pipe 10, and are slightly inclined downward. A relatively large space 51 is formed between the pair of right and left main frames 13, and between the head pipe 10 and the engine E. The fuel vapor supply device 30 is placed in the space 51. The canister 31 of the fuel vapor supply device 30 is mounted via a bracket 40A to a reinforcement plate 52 provided between the pair of right and left main frames 13 to connect the main frames 13 to each other in such a way that the canister 31 is suspended from the reinforcement plate 52. The canister 31 is placed to extend horizontally in such a way that the intake port 33b and the discharge port 33c protrude to the left. The opening/closing valve 32 is placed on the canister 31 and mounted to the bracket 40A.

In the motorcycle 1A configured as described above, the canister 31 is placed closer to the fuel tank 16 and the throttle device 18. Therefore, the tank tube 34 and the supply tube 36 can be shortened.

The motorcycle 1A of Embodiment 2 can obtain advantages similar to those of the motorcycle 1 of Embodiment 1.

[Other Embodiments]

Although in the motorcycle 1, 1A of Embodiment 1, 2, the canister 31 of the fuel vapor supply device 30 is placed to extend horizontally and in the vehicle width direction, the canister 31 may be placed to extend vertically. Although the intake port 33b and the discharge port 33c of the canister 31 are placed to protrude to the left, the intake port 33b and the discharge port 33c may be placed to protrude to the right. In this case, the tank tube 34 and the supply tube 36 can be further shortened.

Although the motorcycle 1, 1A of Embodiment 1, 2 includes the front cowling 44, the front cowling 44 may be omitted from the motorcycle 1, 1A. For example, the components may be covered by the head lamp unit 20, when viewed from the front. Further, the fuel vapor supply device 30 need not be mounted to the mounting unit 21 via the bracket 40, and may be directly mounted to the mounting unit 21.

Although the motorcycles 1, 1A of Embodiments 1, 2 are motorcycles of a multi-purpose type or a dual purpose type, the motorcycles 1, 1A are not limited to being motorcycles of these types, and may be motorcycles of an on-road type or an off-road type.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

LIST OF REFERENCE CHARACTERS

E engine
1, 1A motorcycle
3 vehicle body
4 front wheel
6 front fork
9 vehicle body frame
10 head pipe
13 main frame
16 fuel tank
16a outlet
18 throttle device
20 head lamp unit
21 mounting unit
27 meter device
31 canister
32 opening/closing valve
33b intake port
33c discharge port
34 tank tube
34a canister section
34b tank section
36 supply tube
40 bracket
41 bracket body
41a, 41b a pair of clamps
42 valve mounting plate
44 front cowling

The invention claimed is:

1. A motorcycle comprising:
a fuel tank which stores fuel combusted in an engine;
a vehicle body frame to which the fuel tank is mounted;
a pair of front forks placed spaced apart from each other in a vehicle width direction to support a front wheel from both sides in the vehicle width direction such that the front wheel is rotatable, the pair of front forks being mounted to the vehicle body frame such that the pair of front forks are rotatable around center axes thereof extending vertically, respectively; and
a canister which adsorbs the fuel contained in an evaporative emission present inside the fuel tank and supplies the fuel to the engine,
wherein the fuel tank is formed with an outlet on a side surface thereof, the evaporative emission being taken out through the outlet,
wherein the canister is placed inward in the vehicle width direction relative to the pair of front forks when viewed from a front, and in front of the engine when viewed from a side,
wherein the canister includes a suction port connected to the outlet via a pipe,
wherein the suction port is placed higher than the outlet, and
wherein the pipe extends in an inclined upward direction from the outlet toward the suction port without the pipe having a U-shape.

2. The motorcycle according to claim 1,
wherein the vehicle body frame includes a head pipe at a front end portion thereof,
wherein the pair of front forks are mounted to the vehicle body frame such that the pair of front forks are rotatable around the head pipe, and
wherein the canister is placed in front of the head pipe.

3. The motorcycle according to claim 1,
wherein the vehicle body frame includes a head pipe at a front end portion thereof, and a pair of main frames extending obliquely rearward and outward in the vehicle width direction from the head pipe, wherein the pair of front forks are mounted to the vehicle body frame such that the front forks are rotatable around the head pipe, and wherein the canister is placed rearward relative to the front forks and the head pipe and between the pair of main frames.

4. The motorcycle according to claim 1, wherein the pipe includes an outlet section connected to the outlet, and a suction port section connected to the suction port, and wherein the outlet of the fuel tank and the suction port of the canister are connected to each other in a state in which the outlet section of the pipe and the suction port section of the pipe are joined to each other.

5. The motorcycle according to claim 1, wherein the outlet of the fuel tank is located on a front side of the fuel tank.

6. The motorcycle according to claim 1, wherein the canister is mounted to the vehicle body frame via a canister bracket.

7. The motorcycle according to claim 6, wherein the canister bracket is configured to retain the pipe.

8. The motorcycle according to claim 6, further comprising:

a valve which adjusts an amount of the fuel supplied from the canister to the engine, wherein the canister bracket is configured to retain the valve.

9. A motorcycle comprising:

a fuel tank which stores fuel combusted in an engine;

a vehicle body frame to which the fuel tank is mounted;

a pair of front forks placed to be spaced apart from each other in a vehicle width direction to support a front wheel from both sides in the vehicle width direction such that the front wheel is rotatable, the pair of front forks being mounted to the vehicle body frame such that the pair of front forks are rotatable around center axes thereof extending vertically, respectively;

a canister which adsorbs the fuel contained in an evaporative emission present inside the fuel tank and supplies the fuel to the engine; and a meter device which displays a vehicle speed, wherein the canister is placed inward in the vehicle width direction relative to the pair of front forks when viewed from a front, and in front of the engine when viewed from a side, wherein the vehicle body frame includes a head pipe at a front end portion thereof, wherein the pair of front forks are mounted to the vehicle body frame such that the pair of front forks are rotatable around the head pipe, wherein the canister is placed in front of the head pipe, wherein the meter device is mounted to the vehicle body frame above the head pipe in such a manner that the meter device extends obliquely upward and forward, and wherein the canister is placed on a reverse side of an obverse surface on which the vehicle speed of the meter device is displayed.

10. A motorcycle comprising:

a fuel tank which stores fuel combusted in an engine;

a vehicle body frame to which the fuel tank is mounted;

a pair of front forks placed to be spaced apart from each other in a vehicle width direction to support a front wheel from both sides in the vehicle width direction such that the front wheel is rotatable, the pair of front forks being mounted to the vehicle body frame such that the pair of front forks are rotatable around center axes thereof extending vertically, respectively;

a canister which adsorbs the fuel contained in an evaporative emission present inside the fuel tank and supplies the fuel to the engine; and a cowling mounted to the vehicle body frame to cover a head pipe from the front, a front end portion of the cowling being provided with a head lamp unit, wherein the canister is placed inward in the vehicle width direction relative to the pair of front forks when viewed from a front, and in front of the engine when viewed from a side, wherein the vehicle body frame includes the head pipe at a front end portion thereof, wherein the pair of front forks are mounted to the vehicle body frame such that the pair of front forks are rotatable around the head pipe, wherein the canister is placed in front of the head pipe, and wherein the canister is placed rearward relative to the head lamp unit and covered by the cowling.

* * * * *